3,563,759
CONTINUOUS FERMENTING AND
RIPENING OF BEER
Hans-Carl Wolter, Zossen, Peter Lietz and Peter Steffen, Berlin, Achim Beubler, Berlin-Karolinenhof, and Peter Liebs, Berlin-Wilhelmshagen, Germany, assignors to Institut fur die Garungs- und Getrankeindustrie, Berlin, Germany, a concern of the German Democratic Republic of Berlin, Germany
No Drawing. Filed Sept. 1, 1967, Ser. No. 664,913
Int. Cl. C12c *11/14*
U.S. Cl. 99—31                                5 Claims

ABSTRACT OF THE DISCLOSURE

Beer is produced in a continuous process by dividing beer worts into two partial currents, passing one of these currents through a propagation container wherein yeast is increased and a part of the extract fermented, then mixing the fermenting worts with the second current of non-fermented worts and producing fermentation and ripening in a downwardly flowing liquid column, diacetyl and an extraction portion being decomposed in the lower portion of the column by a homogeneous continuous process.

---

This invention relates to a process for the continuous fermentation and ripening of beer.

It is known that for the production of beer the main fermentation can be carried out as a continuous process, whereby two-stage and multi-stage homogeneously continuous processes are used. Usually during the first stage the yeast is increased by blowing in air, while the main fermentation process takes place in the second stage or in the following stages. Reaction chambers are then arranged horizontally or in cascades. It is also known in prior art to carry out main fermentation in a rising liquid column. According to this procedure the ripening process follows immediately after the main fermentation process, and is usually stationary. Recently a process became known for carrying out a continuous secondary fermentation and ripening.

A process was also used to provide a completely effective continuity of yeast increase and fermentation as well as the immediately following ripening, wherein the yeast increasing process takes place in one stage homogeneously and continuously, whereupon the yeast containing liquid flows downwardly through a temperable fermentation container whereby its ratio-height to diameter is very high. Then the hydrostatic pressure increases corresponding to the carbon dioxide content desired at the outlet. Thereupon the fermented liquid is passed through a ripening installation consisting of one or several containers; it is possible to separate a part of the yeast by known devices between the fermentation container and the ripening installation. While the liquid flows through the ripening installation its pressure can be dropped to a final pressure either in one operation or in steps, whereby the final pressure must correspond to the carbon dioxide content of the final beverage. The poor tasting substances distilled with the freed carbon dioxide are removed through valves. The containers can be so arranged that the direction of flow is downward in the fermentation container and rises in the ripening installation. This process has the advantage of being a completely continuous process. However, the duration of the process is comparatively long and the containers must have a large volume. This is caused by the separation of the fermentation and of the ripening required by the process.

An object of the present invention is to eliminate the drawbacks of prior art processes.

Another object is to shorten the fermentation and ripening by providing better conditions for washing out the volatile poor tasting substances, for the fermentation of the extract portion which ferments with difficulty and for the biological reduction of diacetyl.

Other objects of the present invention will become apparent in the course of the following specification.

In the accomplishment of the objectives of the present invention it was found desirable to provide a process wherein the fermentation and the ripening of the beer take place simultaneously, in that the worts are separated in two partial currents. The first current flows through a propagating stage in which above all there is an increase in yeast and is then joined to the second current consisting of non-fermented worts free of yeast. The flow of the mixture continuing in the form of a downwardly flowing liquid column is carried out in two phases. In the first phase a heterogenous continuous fermentation process is carried out. The outer foam surface of the liquid column can be sprayed and broken up with fermenting beer which is taken from the uppermost part of the liquid column. The height of the liquid column is selected by taking into consideration the pressure prevailing above the liquid column, in such manner that there is the content of carbon dioxide which is desired in the beer, corresponding to the fermentation temperature in the lowermost section.

According to a different embodiment of the present invention the process can be carried out by providing in the first phase the fermentation and ripening as a multi-stage homogenous continuous process. The stages are adjusted in relation to each other and the liquid flows through them from top to bottom so that again a liquid column of a predetermined height is provided. In this embodiment the yeast concentration can be made higher and consequently the amount of the second worts current can be increased for the same container volume.

The yeast increase takes place in one stage and in a homogenous continuous manner. A dilution rate is used to set such as physiological condition of yeast content that a bio-mass is bred which is characterized by a great fermentation activity and by the smallest possible formation of high aliphatic alcohols, esters, organic acids, poorly tasting substances and other taste affecting substances. The formation of these substances takes place in a one stage homogenous continuous process to a substantially greater extent than in the case of a discontinuous process; however, it depends upon the ratio of dilution. It was determined that in the case of beer worts containing 11% to 12% extract at a fermentation temperature of $+8°$ C. to $+9°$ C. the advantageous dilution rate lies at 0.024 h.$^{-1}$. It is possible to diminish the dilution rate depending upon the yeast rate of 0.014 h.$^{-1}$, whereby the productivity of the homogenous continuous propagation stage is increased.

In order to provide oxygen, air can be dosed off in the gas chamber of the propagation container, so that the concentration of the dissolved oxygen amounts to 0.6 mg. to 0.8 mg. in one liter of fermenting worts.

By supplying a non-fermented second partial current of worts and by mixing it with the yeast containing fermenting worts of the first partial current, a dilution takes place of the main and by-products of fermentation contained in the first current, and this has organoleptic advantages as far as certain by-products are concerned.

The first phase of the fermentation and ripening process with decreasing fermentation temperature follows immediately after the propagation process. If this phase is carried out as a heterogenous continuous process then the physiological condition of the yeast contents corresponds to a discontinuous fermentation process which is distinguishable from a heterogenous continuous process solely by a spatial variant. This means that as far as the reactions of this phase are concerned the finished beer must correspond to the usual consumption requirements.

The fact that the process is carried out in a vertical downwardly flowing column, provides a quick drop of the redox potential. In the second phase of fermentation and ripening there is a higher fermentation temperature than in the first phase and this accelerates the fermentation of difficulty fermenting extract portions, as well as a drop in the diacetyl at a low value of the redox potential.

The downwardly flowing fermenting liquid column provided good conditions for eliminating poor tasting substances. Analytical investigations pertaining to the elimination of sulphurated hydrogen from fermenting beer worts and young beer, have determined that an optimal effect takes place only if the elimination takes place during the active fermentation phase. The length of the path traveled by gas bubbles as they pass through the fermenting medium determines the concentration of the poor tasting substances in the gas bubbles, consequently, it determines the result of the elimination. Carbon dioxide flows through the fermenting worts in counter-current, the formation of the poor tasting substances corresponding to fermentation intensity being greatest in the upper portion of the column and dropping in the direction of flow of the fermenting worts.

Following the second phase of the fermenting and ripening process, the yeast can be separated according to a process known per se and partly reintroduced into fermenting worts.

The following examples are given by way of exemplification only:

EXAMPLE 1

(A) Sterile and clear worts with an extract content of 11.05% were separated ito two partial streams. The first partial stream of 135 ml./hr. was passed through a propagation container the contents of which were inoculated with saccheromyces calsbergensis. The biological balance which took place in this homogeneous continuous process was characterized by the following data:

Fermentation temperature: $+8°$ C.
Dilution rate: $0.0141$ h.$^{-1}$
Yeast concentration: $87 \times 16^6$ cells/ml.
Actual extraction content: 5.10% weight
Alcohol content: 3.07% weight
Dissolved $O_2$ concentration: 0.8 mg./l.

To set the dissolved $O_2$ concentration air was introduced in doses into the gas chamber of the propagation container.

(B) Promptly thereafter the yeast-containing fermenting worts were introduced into the head section of a 12 m. high fermentation column and were mixed therein with the second partial stream of 30 ml. non-fermented worts/hr. In this column a heterogenous continuous fermentation process was carried out. The biological balance was characterized by the following data:

Fermentation temperature: inflow $+8°$ C. to outflow $+5°$ C.
Duration: 36 hrs.
Average number of yeast cells in suspension: $30 \times 10^6$/ml.

The fermenting liquid left this stage with the maximum diacetyl content, i.e., before the start of the reduction of diacetyl by the yeast cells.

(C) The fermenting worts are heated in an adjacent reaction chamber to $+12°$ C.; in a homogenous continuous fermentation process the workout fermentation degree was reached and the diacetyl content diminished. The stay period in the $12°$ C. stage amounted to 75 hours. The diminution amounted to 0.447 mg. diacetyl/1., 24 hrs., $30 \times 10^6$ yeast cells.

When leaving this stage beer had an alcoholic content of 3.8% by weight, an actual extract content of 3.67% by weight and a carbon dioxide content of 0.40% by volume.

EXAMPLE 2

This example differs from Exabple 1 in the stage (B).

The amount of the second partial stream was increased to 100 ml. non-fermented worts per hour. An eight-stage homogenous continuous fermentation process was carried out in the column under otherwise the same conditions as in Example 1. The average yeast concentration in the column was set at $100 \times 10^6$ cells/ml. For that purpose the yeast bred in stage (A) was completed by a part of the yeast which was separated from the beer at the stage (C). The duration period of the two partial streams in the column amounted to 40 hours.

EXAMPLE 3

The stages (B) and (C) were carried out in general as in Example 1 or 2. In the stage (A) the dilution rate amounted to 0.0244 h.$^{-1}$ at a fermentation temperature of $+8°$ C. At this dilution rate, the yeast cells are characterized by the maximum fermentation activity. The formation of higher aliphatic alcohols and esters was smaller; however, diacetyl formation was somewhat greater than in Example 1. The biological balance was characterized by an alcohol content of 2% by weight, an actual extract content of 7.15% by weight and a yeast concentration of $70 \times 16^6$ cells/ml.

It is apparent that the above examples have been given solely by way of illustration and not by way of limitation and that they are capable of many variations and modifications within the scope of the present invention. All such variations and modifications are to be included within the scope of the present invention.

What is claimed is:

1. The process of continuously fermenting and ripening beer which comprises separating cleared and cooled beer worts into two currents, subjecting one of said currents to a propagation process for an increase in yeast and partial fermentation of the extract of the wort, then mixing the current of fermenting wort with the current of non-fermented wort, causing the mixture to flow vertically downwardly in a liquid column with decreasing temperature for fermenting and ripening in a first phase, thereafter in a second phase decomposing the difficulty fermenting extract portion and the diacetyl in a homogeneous continuous process in the lower portion of said column at an increased temperature at the lowest value of the redox potential set by the process, removing beer from the bottom of said column and cooling for the removal of albuminous parts unstable in cold and treating the beer for colloidal stabilization.

2. The process in accordance with claim 1, wherein the propagation process of beer wort with an extract content of 11% to 12% is carried out homogeneously and continuously at $8°$ C. to $9°$ C. and a dilution rate of 0.014 h.$^{-1}$ to 0.024 h.$^{-1}$ as well as a concentration of oxygen in solution of 0.6 mg./l. to 0.8 mg./l. in the fermenting worts, oxygen being provided by supplying air into the propagation process.

3. The process in accordance with claim 2, further comprising causing a flow of liberated carbon dioxide in countercurrent through the fermenting worts for the removal of volatile poorly tasting substances, and wherein the height of said liquid column is set corresponding to the fermentation temperature in the lower portion of the column and is determined by the carbon dioxide content desired in the final beer and depending upon pressure prevailing above the liquid column.

4. The process in accordance with claim 1, wherein fermenting and ripening in said liquid column are carried out as a homogeneous continuous process with recirculation of a part of yeast.

5. The process in accordance with claim 4, wherein the last-mentioned process consists of a plurality of stages.

References Cited

UNITED STATES PATENTS

| | | | | |
|---|---|---|---|---|
| 3,117,005 | 1/1964 | Coutts | | 99—31X |
| 3,234,026 | 2/1966 | Coutts | | 99—31 |
| 3,407,069 | 10/1968 | Hall et al. | | 99—31 |
| 3,413,124 | 11/1968 | Akin | | 99—31 |

FOREIGN PATENTS

| | | | |
|---|---|---|---|
| 274,225 | 7/1927 | Great Britain | 99—31 |

OTHER REFERENCES

Hough et al.: New Method of Producing Beer by Continuous Fermentation, Institute of Brewing Journal, vol. 66, 1960 (pages 301–304), TP 500 I79.

LIONEL M. SHAPIRO, Primary Examiner

D. M. NAFF, Assistant Examiner

U.S. Cl. X.R.

99—48